United States Patent
Deak, Sr.

(10) Patent No.: US 10,348,160 B2
(45) Date of Patent: Jul. 9, 2019

(54) ROTATIONALLY ACTIVATED GENERATOR

(71) Applicant: David Deak, Sr., Head of the Harbor, NY (US)

(72) Inventor: David Deak, Sr., Head of the Harbor, NY (US)

(73) Assignee: GENEREN, INC., Head of the Harbor, NY (US)

( * ) Notice: Subject to any disclaimer, the term of this patent is extended or adjusted under 35 U.S.C. 154(b) by 93 days.

(21) Appl. No.: 15/358,625

(22) Filed: Nov. 22, 2016

(65) Prior Publication Data

US 2018/0145561 A1    May 24, 2018

(51) Int. Cl.
*H02K 7/18*      (2006.01)
*H02K 35/00*    (2006.01)
*H02K 99/00*    (2014.01)

(52) U.S. Cl.
CPC ........... *H02K 7/1853* (2013.01); *H02K 35/00* (2013.01); *H02K 99/10* (2016.11)

(58) Field of Classification Search
CPC .. H02K 21/272; H02K 21/27; H02K 21/2706; H02K 21/38; H02K 7/003; H02K 7/14; H02K 7/183; H02K 1/272; H02K 1/27; H02K 1/2706

USPC ............................................. 310/181, 154.02

See application file for complete search history.

(56) References Cited

U.S. PATENT DOCUMENTS 5,275,141 A * 1/1994 Tsunoda ................. H01F 7/145
                                                            123/399

* cited by examiner

*Primary Examiner* — Nguyen Tran
(74) *Attorney, Agent, or Firm* — Tutunjian & Bitetto, P.C.

(57) ABSTRACT

A centrally positioned cylindrical Neodymium magnet that has opposing magnetic poles, radially disposed on either side of a rotational axis extending along the length of the cylindrical magnet and is centered within a central opening of rectangular coil, where it is free to rotate about its axis in either direction. At least one focus magnet (typically a small disk magnet) having axially opposing magnetic poles, each being arrange across each side substantially along a line parallel to the rotational axis of the cylindrical magnet within the frame, to cause the cylindrical magnet's field to be pulled into a more concentrated alignment so that more moving magnetic field lines from the cylindrical magnet can cut through the coil windings when the cylindrical magnet is rotated by an externally applied force.

13 Claims, 9 Drawing Sheets

ROTATIONALLY ACTIVATED GENERATOR

FIELD OF THE INVENTION

The present invention relates to motion activated energy harvesting generators, in particular, to energy harvesting generators having a rotationally actuated magnetic element.

BACKGROUND OF THE INVENTION

Passive energy harvesting from human motion or mechanical vibrations is of great interest for portable electronic devices. Piezoelectric, capacitive, and magnetic transduction mechanisms have all been explored for extracting electrical energy from mechanical motion. Of these, magnetically-based (electrodynamic) transduction is well suited for low-frequency, large-amplitude vibrations or fast rate of change motion or vibration, particularly for human-induced motions.

The present invention may be defined as an energy harvesting generator or electromagnetic energy transducer, that describes and teaches methodologies and means for eliminating a battery, to power microelectronic circuitry that require small amounts of sporadic power to circuits e.g. those that function as a short burst ISM Band transmitter or transceiver, and other classes of microelectronic circuitry for switching, monitoring and sensing systems where it would be advantageous to avoid the pitfalls of using a battery such as where temperature, ambient weather conditions, or isolated and remote locations not favorable for maintaining or changing a battery due to security constraints or other limiting factors that would impede changing a battery.

Prior art currently utilizes a simple magnetic circuit make and break connexion of magnetic pole field lines shorting make connexion or a magnetic pole field lines open or break connexion situation, where the main problem with this type of energy harvester is that the time period for such electrical energy generation is less than 10 milliseconds and the amount of energy produced is extremely small. The overall disadvantages also remain in the use of mechanical springs to "flip" a magnetic element that either shorts out the magnetic field thus collapsing the field or during a less than 10 millisecond flip transition, the magnetic field expands due to a momentary 'none-connect' of the shorting element. At best, such prior art remains as a simple example of a mechanical impulse type of energy transducer and limited by the very action that it relies upon; and thus limiting the time duration and power output of this prior art.

SUMMARY OF THE INVENTION

An exemplary embodiment of the present invention provides a centrally positioned cylindrical Neodymium magnet that is diametrically poled (having opposing magnetic poles, radially disposed on either side of a rotational axis extending along the length of the cylindrical magnet) and is inserted within a hollow non-magnetic tube and retained therein by end caps that each have extended axel members, that when assembled into a single rotational unit, is centered within a central opening of rectangular coil, where it is free to rotate about its axis in either direction. The coil and magnet assembly is inserted within a frame retaining at least one focus magnet typically a small disk focus magnet having axially opposing magnetic poles, each being arrange across each side substantially along a line parallel to the rotational axis of the cylindrical magnet within the frame. Thus, the frame may hold a plurality of small focus magnets (depending on embodiment) to cause the cylindrical magnet's field to be pulled into a more concentrated alignment so that more moving magnetic field lines from the cylindrical magnet can cut through the coil windings when the cylindrical magnet is rotated by an externally applied force, such as a finger or any other mechanical energy source. The focus magnet(s) are aligned in a row on opposite sides of the magnet bed substantially parallel to the cylindrical magnet rotational axis such that their respective magnetic poles face the magnetic poles along length of the rotatable cylindrical magnet. When rotationally displaced from a quiescent position by a finger or other source of tangential force and then released, the cylindrical magnet is urged back to its quiescent position wherein such motion also induces a change in magnetic field through the coil, and the cylindrical magnet may overshoot that quiescent position and oscillate thereacross, yet further inducing a changing magnetic field in the coil to prolong the electrical energy induced in the coil by the rotation of the cylindrical magnet.

Thus the present invention teaches that a vast improvement in time duration and power output of this electromagnetic transducer (generator) is evident in experimental and practiced results of its novel operation and far superiority over prior art simplicity, cost, life cycling, adaptability to a plurality of sensors, micro-circuit transmitters and transceivers.

Moreover, this invention allows for expanded applications such as a novel digitally encoded battery-less and wireless key fob for opening car doors, garage doors, gates, automatic trap shoot launching machines, automatic tennis ball launching machines, and any other type of remote control applications facing limitations such as constant changing of batteries, long term storage or in emergency equipment, or high reliability applications requiring redundant power sources.

BRIEF DESCRIPTION OF DRAWINGS

These and further features of the present invention will be better understood by reading the following Detailed Description taken together with the Drawing, wherein.

DETAILED DESCRIPTION

Figure 1:
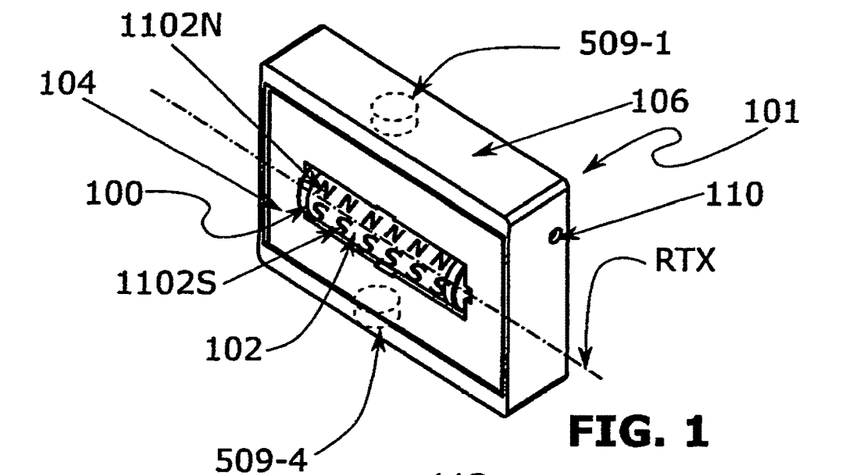
FIG. 1 is a perspective view of one embodiment of the invention.

An exemplary embodiment of the present invention 101 is shown in the top view FIG. 1 where comprising a frame (housing) 106 houses at least a single set of focus magnets 108A and 108B (e.g. neodymium), retained within the frame 106 and disposed on opposite sides of an elongated tubular magnet 102 rotatable about an axis RTX extending along a length and having radially opposing magnetic poles 1102N and 1102S. A rectangular-wound coil 104 is disposed within and retained by the frame 106 and disposed between the focus magnets 108A, 108B and the tubular magnet 102 with a North magnetic pole 1102N along one side 114 and a South magnetic pole 1102S on the opposite side 116 of the outer surface of the tubular magnet 102. In this embodiment, the magnetic poles 1102N and 1102S face the focus magnets 108A and 108B, respectively.

Figure 2A:
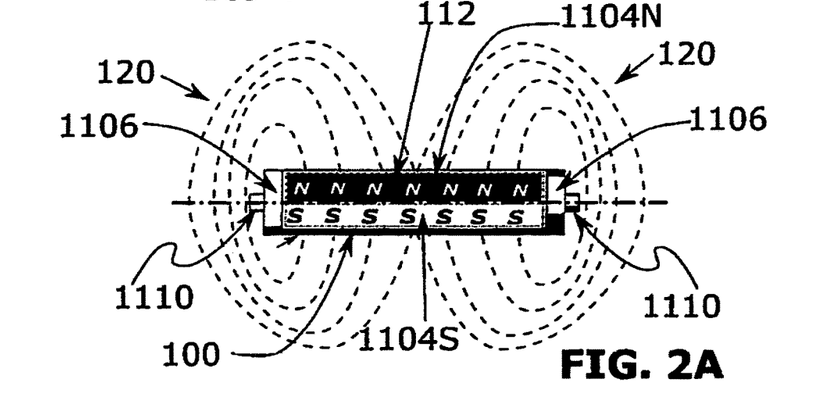
FIG. 2A is a top view of one embodiment of a cylindrical magnet according to the present invention having radially oppositely disposed magnetic poles extending along its length, and rotatable on a center axis with its intrinsic ambient magnetic field lines of flux extending thereover.
Figure 2B:
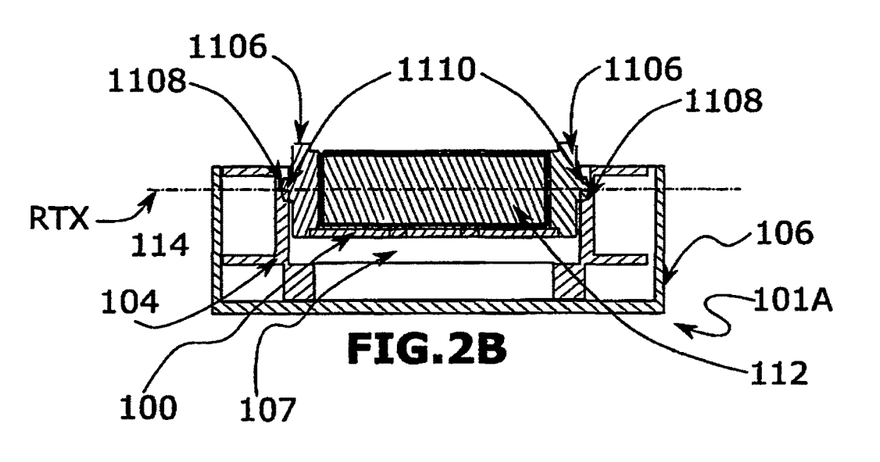
FIG. 2B showing the enclosed magnet of the embodiment of FIG. 2A, in an exemplary enclosure.

In the embodiment of FIG. 2A showing a partial cut-away of an magnet 102 embodiment comprising a tubular magnet 102-A, and FIG. 2B showing the embodiment 101 in cut-away along the axis RTX, and in figures elsewhere, the tubular magnet 102 comprises the cylindrical Neodymium magnet assembly 102-A, that includes a hollow non-magnetic (e.g. plastic, Aluminum, Brass, Copper) tube 100 containing a cylindrical Neodymium magnet 112 therein that is magnetized with a first magnetic pole 1104N extending along a substantially straight line on the surface of the cylindrical magnet 112 throughout its (axial) length, and a second, opposite pole 1104S being disposed on the surface of the cylindrical magnet 112 radially opposite (on the other side of the axis RTX opposite) the first magnetic pole, Here in FIG. 2A, the magnet poles are oriented with the north pole 1104N above the south pole 1104S, which orientation may change by rotation about the axis RTX.

Figure 3A:
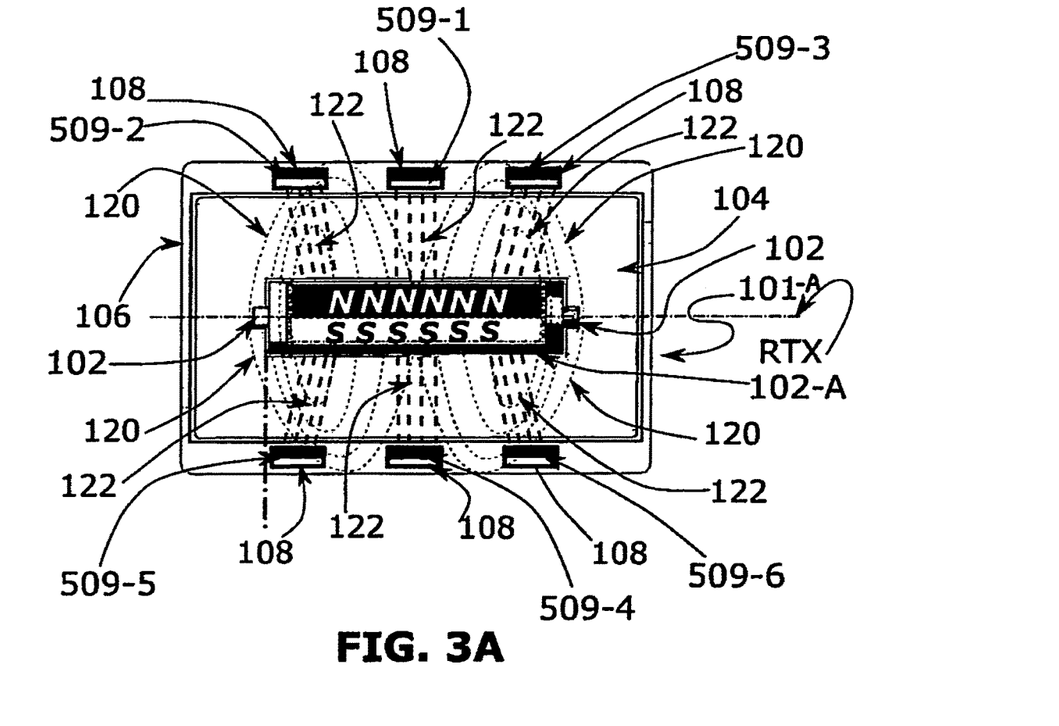
FIG. 3A is a top view of one embodiment of the present invention showing the cylindrical magnet of FIG. 2B disposed within a wire coil in an exemplary rectangular coil bobbin with a series of focus magnets on opposite sides facing the cylinder magnet.

The cylindrical magnet assembly 100-A that is comprised of a hollow cylinder tube 100 containing a Neodymium magnet 112 and this cylinder Neodymium magnet 112, enclosed and held in place by two end caps 102 on opposite side of the hollow tube 100 (that may be epoxy cemented in fixed place within the hollow tube 100), is rotated on the end caps' 102 axially extending members 1110 retained in recess 1108 and on axis RTX, will be rotate in unison upon application of external rotation force, e.g. movement of a finger tangentially thereover. The apparatus frame 106 and the coil bobbin 104 and the cylinder magnet assembly 100-A are all centred on both the centre rotational axis RTX and the centre line axis CL1. In this embodiment the focus magnets (e.g. 509-1 to 509-6), the coil 104, and the cylindrical magnet assembly 100-A axis RTX are disposed on parallel planes where midpoints (e.g. CL1, RTX) overlap when viewed perpendicular from the planes, but the planes may be spaced to provide non-overlap when viewed from a plane edge. Thus, the embodiment of FIG. 3A provides that each focus magnet 509 in each set are centred about the centre reference line CL1 and the rotational axis line RTX. The length of the coil is l, and the centre of the coil length is c, the centre reference focus magnet position is $x_c$ and is positioned on c and the separation of the other focus magnets are $+/-x_c/2$.

The cylindrical Neodymium magnet 112 is held in place stationary within and relative to the hollow tube 100, typically non-magnetic material, e.g. plastic, brass, aluminum, etc., by end caps 1106 disposed at opposite ends of the tube 100, wherein each end cap 1106 includes a protruding axial member 1110 extending from the corresponding end cap 1106, and each is retained by a recess 1108 of a frame space or void 107, and substantially aligned with the axis RTX to allow the Neodymium cylinder magnet assembly 102 free bi-directional rotation substantially within the center of the rectangular coil 104 (around which the coil wire is wound), In one embodiment, the majority of the volume of the Neodymium cylinder magnet assembly 100-A is substantially surrounded by the coil 104. The cylindrical magnet 112 axis RTX is positioned in the centre of the coil and is position referenced by the imaginary reference centre line RTX that goes through the centre of the cylinder magnet's end cap 1106 axially extending members 1108, axles and the axis RTX is substantially centered between the outer boundaries of the magnetic poles, e.g. 1104N and 1104S. Also shown in FIG. 2A are representations 120 of the lines of flux between the north and south poles of the magnet 102.

Figure 3B:
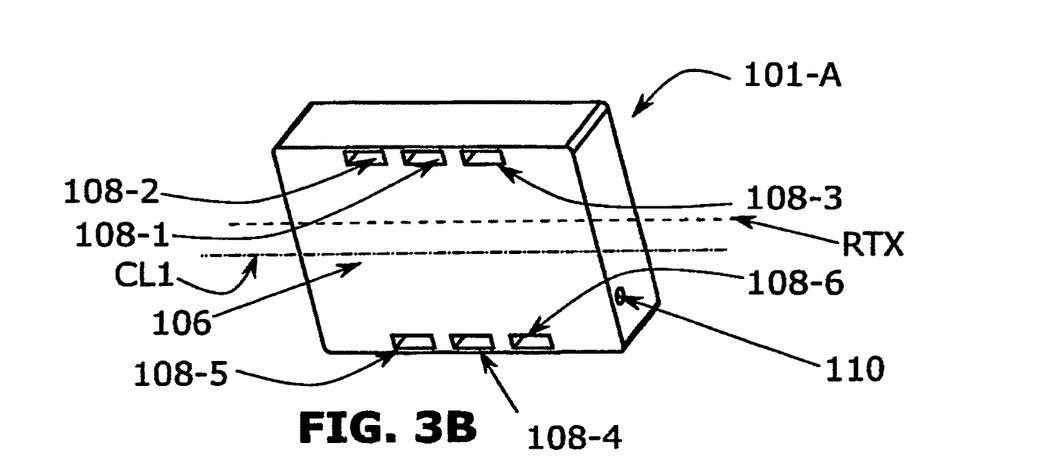
FIG. 3B is a bottom view of the embodiment of FIG. 3A of the invention showing exemplary focus magnet compartments in a formed housing frame.

The embodiment 101-A also shown in FIGS. 3A and 3B, includes a two groups of three separate single-in-line equidistant (first, from the axis RTX and secondly, centred equidistant from each other) rectangular cavities 108 that are utilized for the insertion of focus magnets 509-1, 509-2, 509-3, 509-4, 509-5, 509-6. Each magnet of the two groups (or sets) of focus magnets for the has three single-in-line equidistant cavities 108, FIG. 3B, situated in the frame and on opposite sides of the magnet assembly 102-A where each corresponding individual focus magnet can be inserted. The magnetic polarity of each magnet is represented by substantially white and black portions of the magnets (509-1 to 509-6), and according to the embodiment of FIG. 3A, the polarity of magnets of one group (e.g. 509-1 to 509-3) facing the magnet assembly 102-A is different than the polarity of the magnets of the opposite group (e.g. 509-4 to 509-6) facing the magnet assembly.

FIG. 3B is a bottom perspective view of the embodiment 101-A of FIG. 3A that shows the dual set of single cavities aligned in a line, on opposite sides of the frame 106; where one set of three cavities whose members 108-1, 108-2, 108-3 are internally on the front side and the other set of three cavities whose members 108-4, 108-5, 108-6 are internally on the back side of the magnet bed 106. In some embodiments of the present invention only the centre cavities 108-1 & 108-4 that are aligned (i.e. cony the line and equally spaced from centre line CL1) along a centre line CL1 on opposite sides will have a focus magnet (shown in FIG. 2A) disposed within each cavity. In one embodiment, those (and optionally others) magnets are free to move about within the confines of the cavity 108-1 to 108-6 walls, and the remaining magnets secured to the respective cavity (e.g. by epoxy or mechanical fit).

In an alternate embodiment 101-A having a single focus magnet 509-1 inserted in one centre (relative to ends of the magnet 102) cavity 108 and another single focus magnet 509-4 is inserted in the opposite centre cavity 108 similar to that shown in FIG. 1. In one embodiment, two opposite magnets, e.g. 509-1 & 509-4, can be slightly smaller than their corresponding receiving recesses 108, and when inserted, are not fixed, rather the magnets are free to move up and down within each cavity 108. The two centred focus magnets 509-1 & 509-4 are free to move, and also provide a sound as they bounce up and down within their cavity walls; and that action simulates an electro-mechanical switching sound whenever the cylinder magnet assembly 102 is rotated around its axis of rotation RTX in either direction.

As shown in embodiment 101 of FIG. 3A, the focus magnets 509 all, are aligned as follows; in the first set of focus magnets 509-1, 509-2, & 509-3, the first centre magnet 509-1 contained in its cavity 108-1 both are positioned and aligned with the centre line CL1. A first equidistant (along a first [left] side of axis CL1) focus magnet 509-2 positioned in reference (along a line parallel to RTX) to the centre focus magnet 509-1 is situated on the left side in the first equidistant single-in-line set; and a second equidistant focus magnet 509-3 positioned in reference to the centre focus magnet 509-1 is situated on the right side in the first equidistant single-in-line set; and in the second set of focus magnets 509-4, 509-5, & 509-6, the first centre magnet 509-4 contained in its cavity 108-4 both are positioned and aligned with the centre line CL1. A second equidistant focus magnet 509-5 positioned equidistant in reference to the centre focus magnet 509-4 is situated on the left side in the second equidistant single-in-line set; and a second equidistant focus magnet 509-6 positioned in reference to the centre focus magnet 509-4 is situated on the right side in the second equidistant single-in-line set. From this plurality arrangement of focus magnets (shown in FIG. 3A) that are side-by-side in an equidistant single-in-line set, and aligned along a line parallel to the rotational axis RTX in dual equidistant single-in-line focus magnet sets, with each plurality set on opposite sides of the magnet bed 106; a focused magnetic field 122 is established (separate '122' are shown for each of the sets of the three magnetic generator components shown in FIG. 3A), namely the dual set of focus magnets (e.g. 509-1 to 509-3, and 509-4 to 509-6) and the cylinder magnet assembly 102-A. First there is the natural residual ambient magnetic field 120 of the Neodymium cylinder magnet 102A that encompasses the cylinder magnet assembly 102-A; and due to the cylinder magnet 102A having a region l along its length along axis RTX having radially opposed magnetic poles, e.g. 1104N, 1104S which in this embodiment is also the rotational axis, the residual magnet 102A dipole magnetic field 120 therefore becomes a rotating magnetic field that induces a voltage in the wound coil 104 as the cylinder magnet assembly 102-A is rotated around its centre axis RTX and whose moving magnetic field 120 cuts through the coil windings 104.

FIG. 3A the cylinder magnet assembly 102-A is in position within the coil 104 typically wound on a bobbin, and these two components are inserted within the magnet bed 106 as illustrated. This embodiment 101A of the present invention comprises an electrical generator wherein its operation and efficiency are enhanced by the focused magnetic field 122 established between the cylinder magnet assembly 102-A and each plurality equidistant single-in-line set of focus magnets first set 509-1, 509-2, & 509-3, and second set 509-4, 509-5, & 509-6.

One functional embodiment of the present invention provides a periodic voltage generated with the periodic rotation of the magnet assembly 102-A and function fully without the focus magnets 509 as shown in FIG. 3A. However, for an optimized and fully enhanced embodiment, which is the preferred embodiment of the present invention, the dual set of focus magnets 509 as shown in FIG. 3B, preferably on substantially opposing sides of the axis RTX, are utilized for a significant increase in the range of a factor of 2 to 3 times the amount of periodic electric power, e.g. voltage generated for a given load applied across the coil 104 output leads, without the use of the plurality of focus magnets 509. This range increase is determined by a number of mathematical factors including the equidistant separation of (the center of mass of) each single-in-line focus magnets 509 relative to each other and the distance between each equidistant single-in-line set of magnets 509 from the centre cylinder magnet assembly 102-A. The present embodiment 101A provides a substantially uniform space between focus magnet 509-1-509-6 and axis RTX; however, alternate embodiments may provide different spacings between a particular focus magnet and the axis RTX.

In FIG. 3A the inclusion of the focus magnets 509 arranged in a first equidistant (from axis RTX) single-in-line set 509-1, 509-2, & 509-3 and a second equidistant single-in-line set 509-4, 509-5, & 509-6 and each set is disposed within their respective cavities of first set 108-1, 108-2, 108-3, and second set 108-4, 108-5, 108-6 focuses and intensifies the combined resultant magnetic field that exists between the dual set focus magnets and the centred diametrically poled cylinder magnet assembly 102-A.

As illustrated in FIG. 3A, the exemplary Neodymium cylinder magnet 112 has its North Pole 1104N and its South Pole 1104S diametrically polarized (radially oppositely disposed) along substantially the entire length of the cylinder magnet body 112; and the magnetic field 120 emanates going out of the North Pole and entering into the South Pole by convention all along the length of the magnet cylinder body 112.

As shown in FIG. 3A, the preferably close proximity of the dual sets of focus magnets 509 to the Neodymium cylinder magnet rotor assembly 100-A establishes focused concentrated magnetic fields 122 that provides an increase in the flux density that emanates all throughout the stator coil 104 and therefore a greater change in magnetic field impressed on the coil 104 winding and greater efficiency in converting rotation force applied to the magnet assembly 102A to electrical power. The dual sets of focus magnets are arranged such that their respective facing magnetic poles are in an attractive state (opposite poles) relative to each other that has their North and South Poles aligned North to South for the first set 509-2, 509-1, 509-3 and for the second set 509-5, 509-4, 509-6. In the embodiment 101, some magnets, e.g. the first set has its two end magnets 509-2 & 509-3 in the equidistant single-in-line fixed in place within their respective cavities 108-2 & 108-3 by epoxy cement, and other magnets, e.g. the centre focus magnet in the first set 509-1 is free to move within its respective cavity. The movable centre focus magnet in the first set 509-1 will move every time the Neodymium cylinder rotor assembly 102-A moves in either direction along its rotational axis RTX; thus producing a sound that simulates the tactile sound of an electromechanical hard wired switch. Also simultaneously, the movable centre focus magnet in the second set 509-4 will move every time the Neodymium cylinder rotor assembly 102-A moves in either direction along its rotational axis RTX; thus producing a sound that simulates the tactile sound of an electromechanical hard wired switch. As an added feature of the movable centre focus magnets 509-1 & 509-4 their movement also aids in the focused magnet field 122 in the immediate area of them, which adds an additive amount of induced voltage in the coil and increases the induced time duration a few percent and this is due to the movable focus magnet(s) 509-1 & 509-4 moving several times during the period when the Neodymium cylinder magnet assembly 100-A springs forth and back for a number of cycles causing an induced damped sine wave voltage to be produced in the coil 104.

As may be visualized in FIG. 3A and FIG. 3B, the first focus magnet set the left of centre focus magnet 509-1 may be a fixed focus magnet 509-2 that is epoxy cemented and unmovable within its respective cavity 108-2 and the right of centre focus magnet 509-3 us epoxy cemented and unmovable within its respective cavity 108-3. The second focus magnet set the left of centre focus magnet 509-4 the fixed focus magnet 509-5 may be epoxy cemented and unmovable within its respective cavity 108-5 and the right of centre focus magnet 509-6 us epoxy cemented and unmovable within its respective cavity 108-6.

Figure 4:
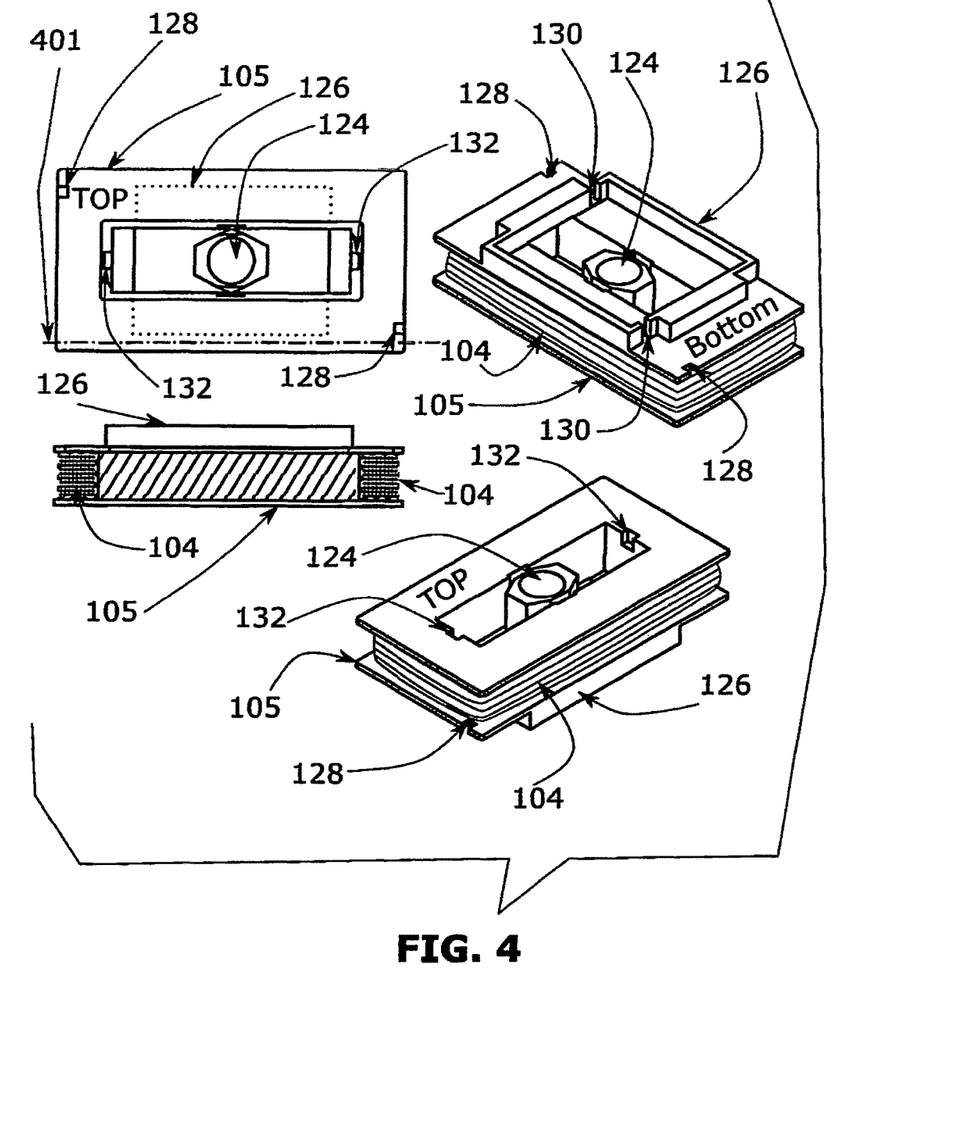
FIG. 4 shows several views of an exemplary coil bobbin useful in manufacture and illustrating a removable center knockout ring that is engaged by a coil winding machine for winding turns of copper magnet wire on the bobbin.

FIG. 4 illustrates a top view, a top perspective view, a bottom view, and a bottom perspective view of one embodiment of the wire coil 104 and process of manufacture includes a wound coil bobbin 105 that is the stator for the generator embodiment of the present invention as shown in FIG. 1 and in other figures. The knock out, removable after winding coil 104 on bobbin 105 is complete and before insertion of magnet assembly 102A, element 124 in the centre of the coil bobbin 105 is for inserting the coil bobbin 105 on a coil winding machine spindle rod, where the coil bobbin 105 recess is wound with a plurality of turns to create the electrical coil 104 for the stator of the generator embodiment. The coil bobbin 104 also has two opposing axle wells 132 (similar to recesses 1108 of FIG. 2b) that accommodates and seats the axially extending members axles on the end caps 1106 of the Neodymium cylinder magnet assembly 102-A as shown in FIG. 2B; and the cylinder magnet assembly 102-A is free to rotate in either direction clockwise or anti-clockwise around the rotational reference axis RTX.

Figure 5A:
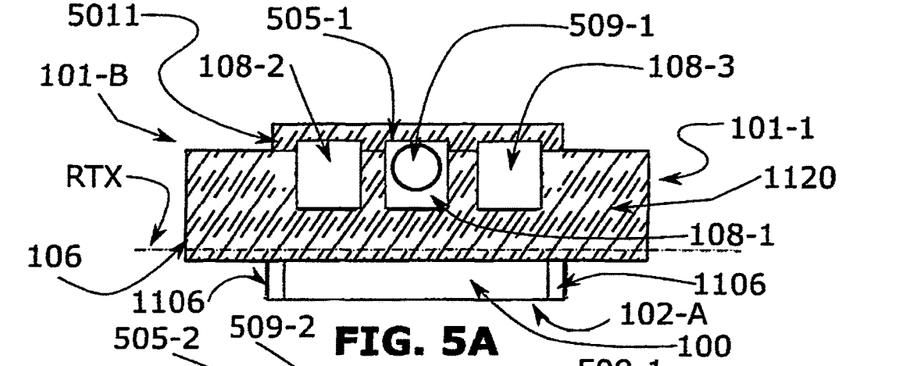
FIG. 5A is a side cross-sectional view of one side of one embodiment of the invention showing a rotating cylinder magnet assembly and a single center movable focus magnet.

FIG. 5A is a front sectional cutaway view of an exemplary alternate embodiment of the present invention 101-B whose cutaway section cuts half way through each focus cavity 108 on a first side 1120 of the embodiment 101-C to expose the focus magnets within each cavity. With this preferred embodiment there is only one focus magnet 509-1 on the first side and one focus magnet 509-4 (not shown) on the obscured distal second side of the frame 106, wherein these two magnets are free to move within their respective cavities 507-1 & 507-4 (not shown) as discussed above. Focus magnets in the aggregate or in addition, seen and unseen, are referred to as 509 and include reference to one or more focus magnets 509-1 to 509-6.

Figure 5B:
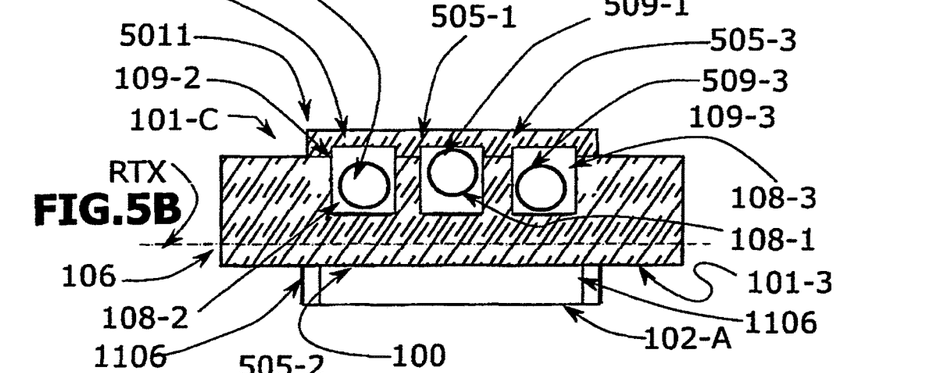
FIG. 5B is a side cross-sectional view of the invention of an alternate embodiment showing a rotating cylindrical magnet assembly and a center movable focus magnet and two adjacent stationary end magnets.
Figure 5C:
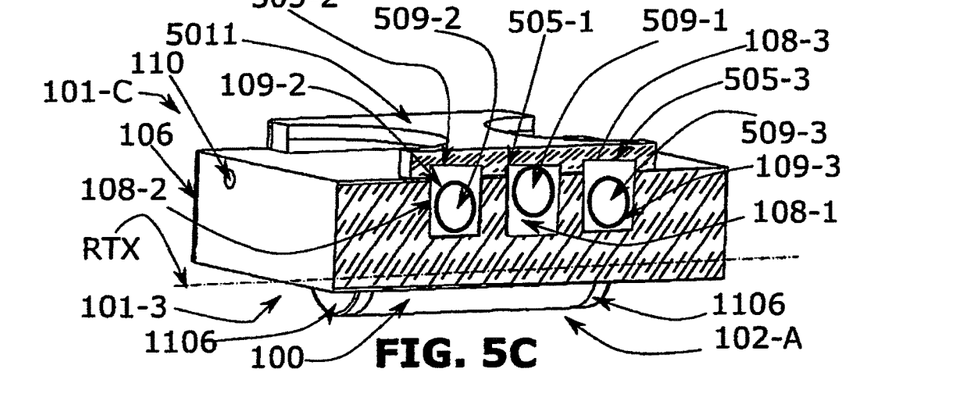
FIG. 5C is a perspective view of the invention of the embodiment of FIG. 5B showing focus magnet positions, focus magnet retaining cover, and the axially rotating cylindrical magnet assembly.

The embodiment 101-B of FIG. 5A, having only a set of centre focus magnets 509-1 & 509-4 (509-4 not shown) and the two end cavities are empty of a focus magnet, produces less power that the embodiment of FIG. 5B & FIG. 5C described below, that contains six focus magnets. The embodiment 101-B of FIG. 5A would be utilized in an application requiring less electrical power output, e.g. where a connected remote-control transmitter having an extended range of transmission was not required. With the embodiment using six focus magnets in the following embodiments 101-C of FIGS. 5B, 5C connected to a Model SAFA9C-XTR transmitter manufactured by RF Solutions, Ltd. UK, the free line of sight range to its corresponding receiver, e.g. Model SAFA9C-RCVR also manufactured by RF Solutions, Ltd. UK, is approximately 500 meters and the embodiment of two focus magnets having a strength of 2700 gauss spaced 10 mm apart from a magnet 102 (in a coil of 3500 turns between the focus magnets and rotating magnet 102 as shown in FIGS. 5B, 5C below, would be usable for a free line-of-sight range of approximately 500 meters. For example, with both embodiments (5A and 5B, 5C) the focus magnets used are approximately 5 mm diameter and ⅕ mm thickness with a magnetic pole strength of 2700+/−10% tolerance Gauss and using a diametrically cylinder magnet 112 with dimensions of 9.5 mm in diameter and 25 mm long having a pole strength of 6200 micro Teslas+/−10% tolerance. For the embodiment with two focus magnets one of the applications powered entirely by the electrical power produced by the present invention, and for the embodiment of six focus magnets one of the applications, e.g. a battery-less and wireless remote gate opening and closing system.

An alternate embodiment 101-C as shown in FIG. 5B and FIG. 5C as front sectional cutaway {shading reversed} views include three focus magnets 509-2, 509-1, 509-3 on the first side 1122 of this embodiment 101-C and three focus magnets 509-5, 509-4, 509-6 on the second side (not shown) of embodiment 101-C. The two centre focus magnets are disposed one focus magnet on the front side 509-1 and one focus magnet on the back side 509-4 and these two magnets are free to move within their respective cavities 507-1 & 507-4.

The focus magnets in FIG. 5B and FIG. 5C are identified as, two 509-2 & 509-3 on the first (front, in this view) side 1122 of the frame 106 and two 509-4 & 509-6 on the second (back) side (not shown) of the frame 106 are typically fixed in their respective cavities 507-2 & 507-3 and 507-4 & 507-6 (e.g. by epoxy cement or by close-fit) to hold them fixed and unmovable with their respective cavities 108 all, while the two centre movable focus magnets, one 509-1 on the front side and one on the second (back side, not shown) are free to move with their respective cavities 507-1 and 507-4. Other arrangements of particular fixed and movable focus magnets are also available according to the present invention.

All of the focus magnets are further secured and hidden away by a bottom surface of the frame 106 with a front shallow centre cavity 507-1 and a back shallow centre cavity (not shown) that allows for more volume for the movable focus magnets 509-1 (& 509-4 not shown) to move freely when influenced by the cylinder magnet assembly 102-A being rotated in either a clockwise or anti-clockwise direction around it axis of rotation RTX.

Figure 6A:
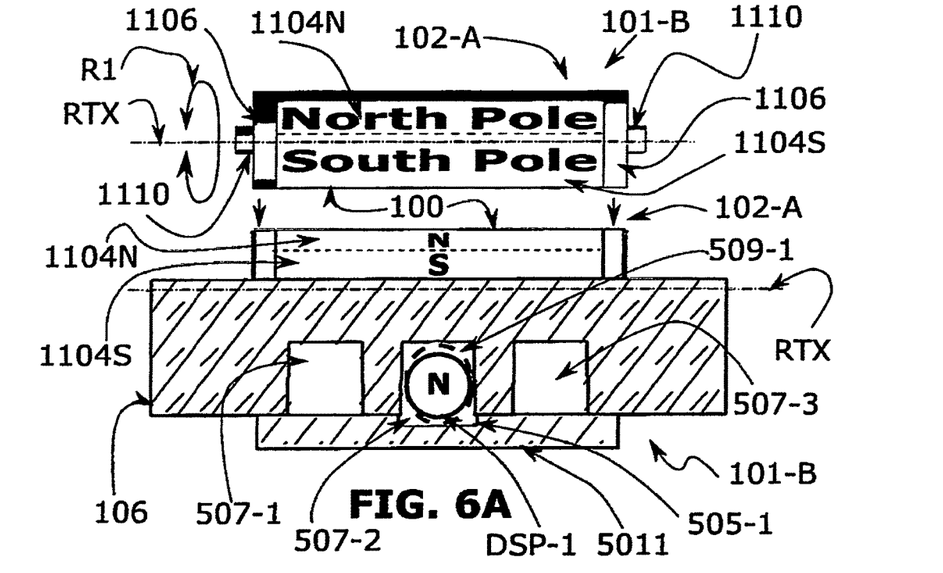
FIG. 6A is a side view of the embodiment of the invention of FIG. 5A illustrating the axially rotatable cylindrical magnet assembly with the South pole positioned to be the dominant magnetic force that influences the shown center moveable focus magnet.

The embodiment 101-B is further discussed in FIG. 6A having a single centred focus magnet 509-1 on the first (front) side of the preferred embodiment utilized as a battery-less and wireless key fob for vehicles and other remote control operations (for the transmitter/receiver identified above) for short to medium range (30 to 100 meters) control. The cylinder magnet rotor assembly 102-A is comprised of a hollow tube 100 that has a radially oppositely magnetically poled 1104N & 1104S cylindrical magnet 112 disposed within in the tube 100 hollow core, and typically fixed with epoxy cement (not shown) and secured on opposite ends by end caps with axially extending members 1110 where the end caps 1106 are fixed, by epoxy cement or super glue to the ends of the hollow tube 100 with cylinder magnet 112 with its North Pole 601 in the top position and its South Pole 603 radially opposed (i.e. on the other side of the center of the magnet 112) in the bottom position, both poles extending substantially along all of the length of the cylinder magnet 112.

FIG. 6A also shows the cylindrical magnet assembly 102-A centre inserted and free to rotate on radially extending members 1110 (coinciding with the axis RTX in this embodiment) received within corresponding recesses 1108 (or other bearing elements) of the wound coil 104 bobbin 105 that is disposed within the frame 106 that contains the single front side movable focus magnet 509-1 received within recess 507-2, and the single back side movable focus magnet 509-4 not shown.

The complete generator 101-B of FIG. 6 shown with the movable front side focus disk magnet 509-1 positioned momentarily in the up position relative to its nominal mid position DSP-1 in its cavity 507-2 due to the cylinder magnet assembly 102-A being rotated going into the paper representing relative to the rotational axis RTX rotating in a clockwise manner. A shallow centre cavity 505-1 & 505-4 in the bottom cover 5013 applied over the cavities 507 receiving the magnets 509 allows an increased the focus magnet's movement within the enclosed cavity arrangement including recess including cavity 507-2 and 505-1 and if desired, a corresponding combination for a magnet on in a cavity combination on the opposite side of the magnet assembly 102-A. The left end cavity 507-1 may be empty of any focus magnet, by intentional design, in this embodiment and the right end cavity 507-3 may also empty of any focus magnet, by intentional design, in this embodiment.

Figure 6B:
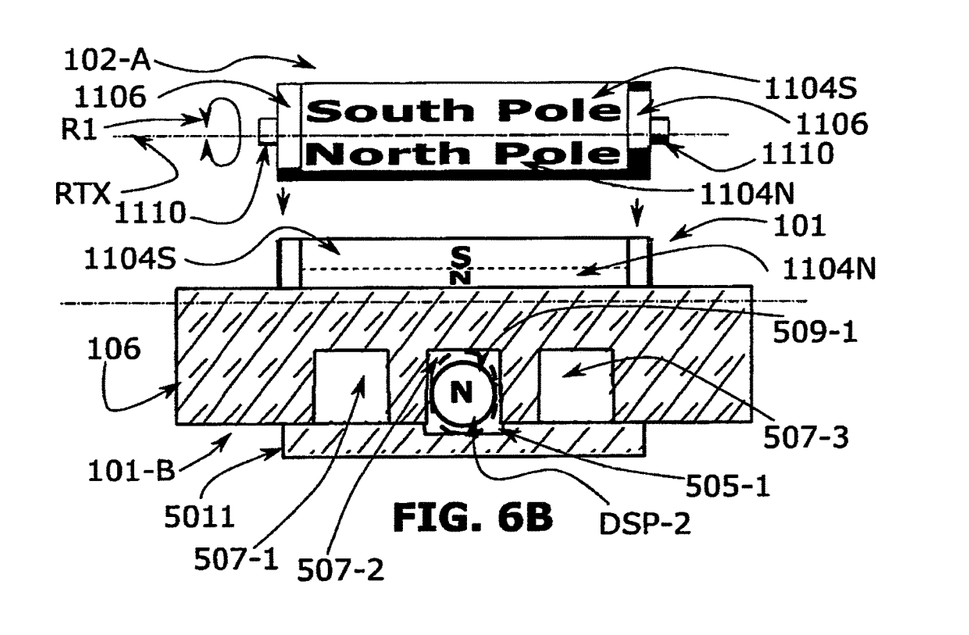
FIG. 6B is a side view of the embodiment of the invention of FIG. 6B illustrating the axially rotatable cylinder magnet assembly with the North pole being the dominant magnetic force that influences the shown center moveable focus magnet.

FIG. 6B shows the single centred (along the axis RTX) focus magnet 509-1 on the first (front) side of the preferred embodiment providing a modest electrical power output.

The cylinder magnet rotor assembly 102-A comprises the structure described above with regard to FIG. 6A.

The complete generator of embodiment 101-B with the movable front side focus disk magnet 509-1 positioned momentarily in an extreme (down) position relative to its equilibrium position DSP-2 in its cavity 507-2 & 505-1 typically due to the cylinder magnet assembly 100-A being rotated (out of the paper) representing relative to the rotational axis RTX rotating in an anti-clockwise manner. The shallow centre cavities 505-1 & 505-4 in the bottom cover 5013 provides an increased available focus magnet's movement within the enclosed cavity arrangement 507-1 and 505-1.

Figure 7A:
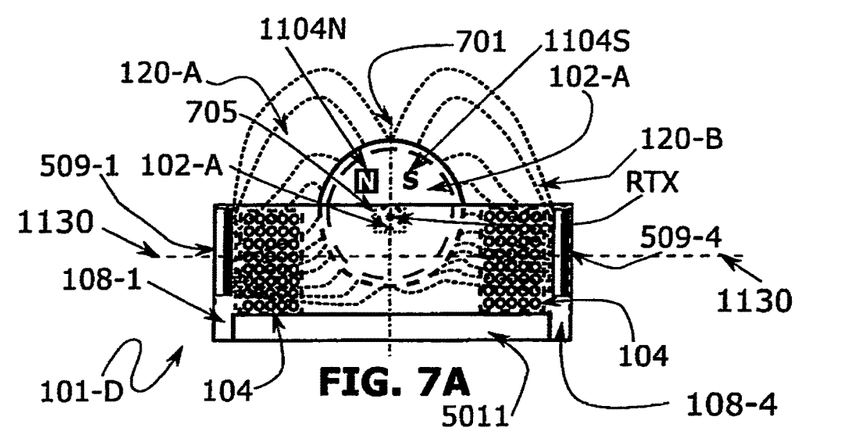
FIG. 7A is a side cross-section view of one embodiment of the present invention showing the magnetic flux lines from a centrally disposed cylindrical magnet assembly permeating throughout a surrounding coil of wire with the cylindrical magnet in a quiescent position, non-activated, zero output induced voltage condition.

FIG. 7A is a cut-away view of an embodiment 101-D of the present invention showing an equilibrium (quiescent) position between the magnet 112 and focus magnets of the embodiment 101-D of the present invention whereby the complete cylinder magnet assembly 102-A centred and rotatable about axis RTX within the wound coil 104 bobbin 105, wherein the magnet 112 rotational axis RTX is offset from the coil midline. With no external mechanical force applied (human finger or thumb), cylinder magnet assembly 102-A is at its polar quiescent position of the cylinder magnet's North Pole 601 left of the vertical centre axis 701 caused by the magnetic force from the first side centre focus magnet 509-1 with its magnetic poles (e.g. S) in a designed magnetically attractive arrangement relative to an opposite pole (e.g. N, 1104N) of the centred cylinder magnet assembly 102-A; and with no external force applied (human finger or thumb) the cylinder magnet assembly 102-A is at its, focus magnet magnetic influenced, polar quiescent position of the cylinder magnet's South Pole 1104S right of the vertical centre line 701 indicating the boundary or midpoint between poles 1104N and 1104S, caused by the magnetic influence of the second side (right in this figure) centre focus magnet 509-4 with its magnetic poling in a designed magnetically attractive arrangement relative to the centred cylinder magnet assembly 102-A.

Figure 7B:
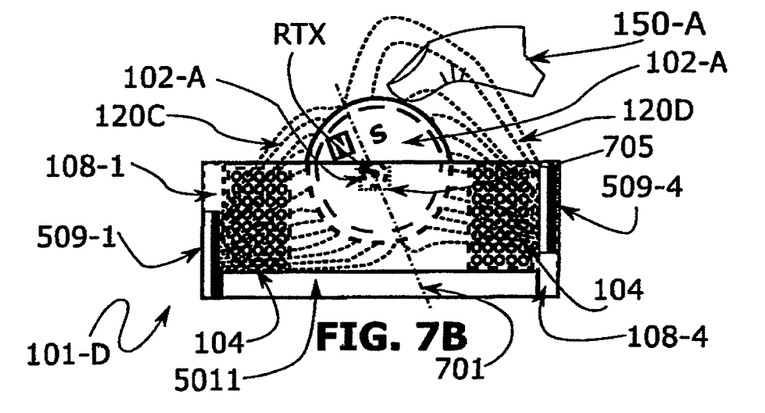
FIG. 7B is a side cross-section view of the embodiment of the invention of FIG. 7A showing a condition where the cylindrical magnet is moved anti-clockwise and the magnetic flux lines are stretched downward through the coil on the left side and upward through the coil on the right side.

In the arrangement condition of FIG. 7B, an external force (human finger or thumb 130) moves and flicks the cylinder magnet assembly 102-A and rotates the assembly 102-A on its rotational axis RTX in an anti-clockwise direction for a minor portion of the circumference of the magnet assembly 102-A instantly flick back to its quiescent condition in a manner that diminishingly rotates and oscillates clockwise and anti-clockwise about its quiescent position (as shown in FIG. 7A). When the magnet assembly 102-A is moved back by a finger or thumb, the encompassing magnetic field 120A is distorted and the left side North Pole 1104N of the cylinder magnet assembly 102-A is compressed inward towards the left focus magnet 509-1 direction and if movable in the corresponding cavity, this action magnetically forces the left focus magnet 509-1 downward in its cavity 108-1. Simultaneously as the magnet assembly 102-A is moved back by a finger or thumb, the encompassing magnetic field 120A is distorted and the right side South Pole 1104S of the cylinder magnet assembly 102-A is stretched outwards away from the right focus magnet 509-4 direction and if movable within its cavity 108-4, this action magnetically forces the right focus magnet 509-4 upward in its cavity 108-4.

Figure 7C:
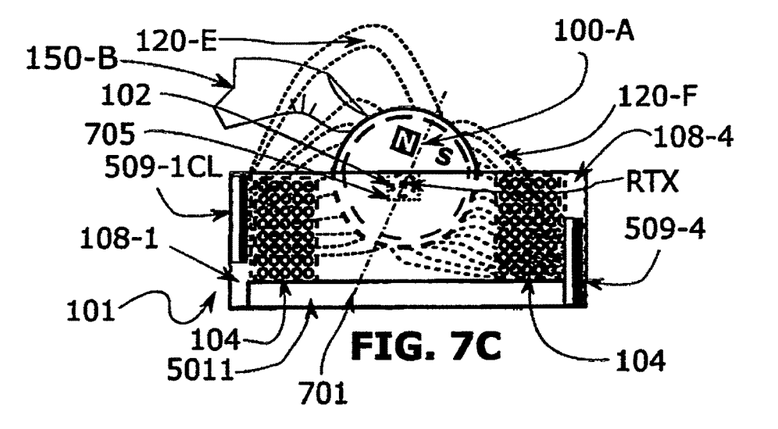
FIG. 7C is a side cross-sectional view of the embodiment of FIG. 7A showing a condition where the cylindrical magnet is moved clockwise and the magnetic flux lines are stretched downward through the coil on the right side and upward through the coil on the left side.

In the arrangement condition of the embodiment 101-D of FIG. 7C, an external force (human finger or thumb 130) moves and flicks the cylinder magnet assembly 102-A and rotates the assembly 102-A on its rotational axis RTX in a clockwise direction; and as the external force (finger or thumb) is instantly released, the assembly 102-A will instantly flick back to its quiescent condition in a manner that diminishingly rotates clockwise and anti-clockwise to its quiescent position (as shown in FIG. 7A). When the magnet assembly 102-A is cocked back by a finger or thumb, the encompassing magnetic field 120A is distorted and the right side South Pole 1104S of the cylinder magnet assembly 102-A is compressed inward towards the right focus magnet 509-4 direction and if the magnet 509-4 is movable within its cavity 108-4, this action by vectors of magnetic force, therein forces the right focus magnet 509-4 downward in its cavity 108-4. Simultaneously as the magnet assembly 102-A is cocked back by a finger or thumb, the encompassing magnetic field 120A is distorted and the left side North Pole 1104N of the cylinder magnet assembly 102-A is stretched outwards away from the left focus magnet 509-1 direction and this action magnetically forces the left focus magnet 509-1 upward in its cavity 108-1. 705 is the axle well where the axle is seated and confined in to rotate.

Figure 8A:
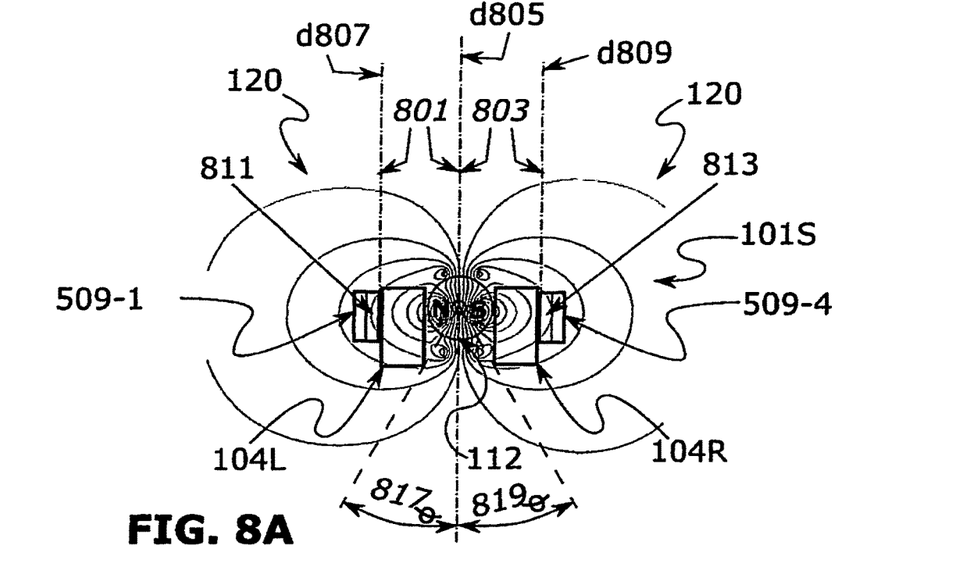
FIG. 8A is a simplified cross-sectional view of an exemplary embodiment showing a magnetic field of a cylindrical magnet that surrounds a wound coil, where the cylinder is at quiescent (no motion) with a zero voltage output.

FIG. 8A is a side graphic view of a simplified embodiment 101S looking into the axis RTX going into a plane perpendicular to axis RTX and also cutting through the coil 104 (showing portions 104L and 104R) and through magnets 509-1 and 509-4, for analysis of the principles of physics behind the operation of the block diagram representation generator of embodiments 101A-101-D of a simplified embodiment of the present invention with two focus magnets, one on the first (left) side 509—of the coil 104 and one on the right side 509-4. A centre reference line d805 running through the centre of the cylinder magnet assembly 100-A is used as a first reference line that is a line of demarcation separating the North Pole of the cylinder magnet 112 and the South Pole of the cylinder magnet 112 in the quiescent position, which is for referencing the distance, described as a second reference line d807 to the left focus magnet's South Pole that faces the North Pole of the cylinder magnet assembly 102-A, wherein the distance 801 determines the first magnetic force of attraction, whose magnitude obeys the inverse square law (i.e., force is proportion to the inverse of the square of the distance from the source of the force) that further predicts and influences in part, the time derivative induced coil terminal voltage output and maximum power determined mathematically by Maxwell's Equations, Faraday's Law, Kirchhoff's Law, and Ohm's Law.

The centre reference line d805 in FIG. 8A running through the centre of the cylinder magnet assembly 102-A (in quiescent position) is used as a first reference line that is a line of demarcation separating the South Pole of the cylinder magnet 112 and the North Pole of the cylinder magnet 112, which is for referencing the distance, described as a third reference line d809 to the right focus magnet's North Pole that faces the South Pole of the cylinder magnet assembly 102-A; and the distance 803 determines the second magnetic force of attraction, whose magnitude obeys the inverse square law that further predicts and influences in part, the time derivative induced coil terminal voltage output and maximum power determined mathematically by Maxwell's Equations, Faraday's Law, Kirchhoff's Law, and Ohm's Law.

Figure 8B:
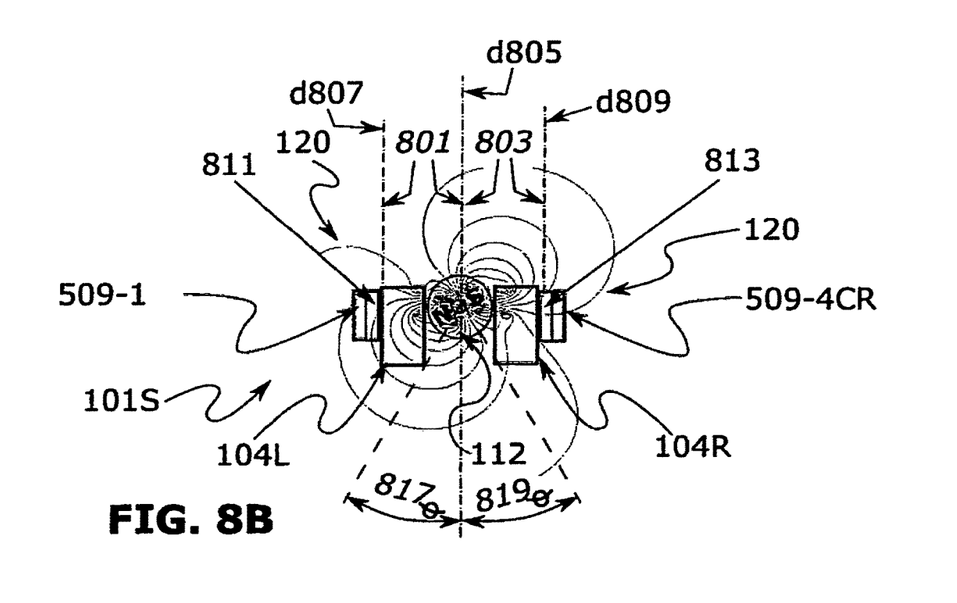
FIG. 8B is a simplified cross-sectional view of an exemplary embodiment of FIG. 8A showing the magnetic field of the cylinder magnet that surrounds a wound coil, where the cylinder is at an anti-clockwise position from which an abrupt release produces an induced voltage output from the coil of one initial polarity.

In FIG. 8B, there are shown two preferred maximum angular displacement range regions from the quiescent position of FIG. 7A, a first angular displacement range 817θ on the left side of the line of demarcation d805, and a second angular displacement range 819θ on the right side of the line of demarcation d805. These angular displacement regions describe the maximum range that the cylinder magnet assembly 102-A; and in FIG. 8B whenever the cylinder magnet assembly 102-A is rotated in an anti-clockwise direction forth-from and back-to its quiescent pole centred position, the magnetic flux density changes through the left coil region 104L defined by the centre line of demarcation d805 and the first angular displacement range 817θ; and in FIG. 8B whenever the cylinder magnet assembly 102-A is rotated in an anti-clockwise direction forth-from and back-to its quiescent pole centred position d805, the magnetic flux density simultaneously changes through the right coil region 104R defined by the centre line of demarcation d805 and the second angular displacement range 819θ. The above may also apply to embodiments having a plurality of magnets 509 on one or both (first and second) sides of the magnet 112.

FIG. 8A is a graphic view of a simplified embodiment 101S for analysis of the principles of physics behind the operation of the block diagram representation generator embodiments 101A-101-D of a preferred embodiment of the present invention with two focus magnets, one on the first (left) side 509-1 of the coil portion 104L and one on the second (right) side 509-4 of coil portion 104R. A centre reference line d805 running through the centre of the cylinder magnet assembly 102-A (and corresponding to line 701 of FIGS. 7A-7C) is used as a first reference line that is a line of demarcation separating the North Pole of the cylinder magnet 112 and the South Pole of the cylinder magnet 112, which is for referencing the distance, described as a second reference line d807 to the left focus magnet's South Pole 811 that faces the North Pole of the cylinder magnet assembly 102-A; and the distance 801 determines the first magnetic force of attraction 801, whose magnitude obeys the inverse square law that further predicts and influences in part, the time derivative induced coil terminal voltage output and maximum power determined mathematically by Maxwell's Equations, Faraday's Law, Kirchhoff's Law, and Ohm's Law.

The centre reference line d805 in FIG. 8A running through the centre of the cylinder magnet assembly 102-A is used as a first reference line that is a line of demarcation separating the South Pole of the cylinder magnet 112 and the North Pole of the cylinder magnet 112, which is for referencing the distance, described as a third reference line d809 to the right focus magnet's North Pole 813 that faces the South Pole 1104S of the cylinder magnet assembly 102-A; and the distance 803 determines the second magnetic force of attraction, whose magnitude obeys the inverse square law that further predicts and influences in part, the time derivative induced coil terminal voltage output and maximum power determined mathematically by Maxwell's Equations, Faraday's Law, Kirchhoff's Law, and Ohm's Law.

Figure 8C:
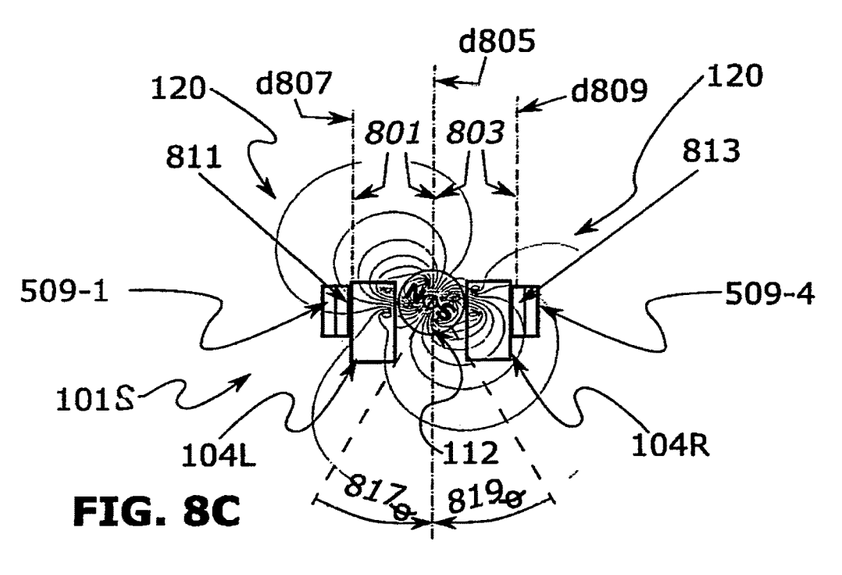
FIG. 8C is a simplified cross-sectional view of an exemplary embodiment of the embodiment of FIG. 8A, showing the magnetic field of a cylindrical magnet that surrounds a wound coil, where the cylinder is at a clockwise position from which an abrupt release produces a voltage output of an initial polarity that is opposite polarity generated in FIG. 8B.

In FIG. 8A, there are two preferred maximum angular displacement range regions, a first angular displacement range 817θ on the left side of the line of demarcation d805, and a second angular displacement range 819θ on the right side of the line of demarcation d805. These angular displacement regions describe the maximum range that the cylinder magnet assembly 102-A. In FIG. 8C whenever the cylinder magnet assembly 102-A is rotated in an anti-clockwise direction forth-from and back-to its quiescent pole centred position (shown in FIG. 8A), the magnetic flux density changes through the left coil region 104L defined by the centre line of demarcation d805 and the first angular displacement range 817θ; and in FIG. 8C whenever the cylinder magnet assembly 102-A is rotated in an anti-clockwise direction forth-from and back-to its quiescent pole centred position d805, the magnetic flux density simultaneously changes through the right coil region 104R defined by the centre line of demarcation d805 and the second angular displacement range 819θ.

The mathematical analysis for the various embodiments of the present invention's operation of harvesting electrical energy from applied mechanical or physical motion for any useful purpose is calculated as:

The magnetic attractive vector force $\vec{F}_{801}$ (1) between the cylinder magnet 112 and the centre left focus magnet 509-1CL on the front side of the magnet bed 106.

$$\vec{F}_{801} = \frac{(\vec{M}_{801} \times \vec{M}_{Ref})}{d_1^2 - \cos(817\theta)} \quad (1)$$

$\vec{F}_{801}$=the static (quiescent) force 801 between the cylinder magnet 112 and the left focus magnet 509-1. $\vec{M}_{801}$=the flux density at the poles of the left focus magnet 811.

$\vec{M}_{Ref}$=the flux density at the poles of the cylinder magnet 112.

$d_1-\cos(817\theta)$=The distance times the cosine of the angle 817θ between the South Pole of the left focus magnet 811 and the North Pole of the cylinder magnet 112.

The magnetic attractive vector force $\vec{F}_{803}$ (2) between the cylinder magnet 112 and the centre right focus magnet 509-4 on the front side of the frame 106.

$$\vec{F}_{803} = \frac{(\vec{M}_{803} \times \vec{M}_{Ref})}{d_1^2 - \cos(819\theta)} \quad (2)$$

$\vec{F}_{803}$=the static (quiescent) force 803 between the cylinder magnet 112 and the left focus magnet 509-4.

$\vec{M}_{803}$=the flux density at the poles of the left focus magnet 813.

$\vec{M}_{Ref}$=the flux density at the poles of the cylinder magnet 112.

$d_1-\cos(819\theta)$=The distance times the cosine of the angle 819θ between the South Pole of the left focus magnet 813 and the North Pole of the cylinder magnet 112.

The total force existing between the cylinder magnet assembly 100-A and the two centre focus magnets 509-1 & 509-4 is expressed mathematically as (3) & (4):

$$\vec{F}_{TR} = \sum_{x=801}^{803} \vec{F}_x = (\vec{F}_{801} \times \vec{F}_{803}) \quad (3)$$

$$\vec{F}_{TR} = \left[\left\{\frac{(\vec{M}_{801} \times \vec{M}_{Ref})}{d_1^2 - \cos(817\theta)}\right\}\right] + \left[\left\{\frac{(\vec{M}_{803} \times \vec{M}_{Ref})}{d_1^2 - \cos(819\theta)}\right\}\right] \quad (4)$$

In the conditions of FIG. 8A the amount of power generated at these quiescent conditions are zero watts, because magnetic flux 120 change is zero and consequently the induced voltage at the coil 104 terminals (not shown) with no cylinder magnet assembly 102-A movement according to Faraday's Law (5) & (6) is zero.

Faraday's Law the time derivative version $$V = -N\frac{d\theta}{dt}, \quad (5)$$

or the differential version $$V_\Delta = N\frac{\Delta\theta}{\Delta t}, \quad (6)$$

The changing magnetic field is described by Lenz's Law (7):

Lenz's Law states that: $\theta = \vec{B}\vec{A} \cos \theta$ (7)

$$\therefore V = -N\frac{\Delta(\vec{B}\vec{A} \cos \theta)}{\Delta t} \quad (8)$$

The induced voltage V (8) in a magnetic rotational generator's coil 104 is directly proportional to the number of turns N in the coil and the time derivative (differential) of the magnetic flux ($\vec{B}$) 120 surrounding and permeating in an area ($\vec{A}$) of the coil 104 and the trigonometric function the cosine of the angle theta cos θ relating to the rotation of the cylinder magnet assembly 100-A.

A typical Neodymium (Grade 52) disc focus magnet 509 that was used in the embodiments 101A-101D has a diameter of 6.35 mm and is 1.6 mm thick and its surface magnetic flux value will be in a range of 2,850 to 3,390 Gauss; and with a $B_r$ (the internal residual magnetism, characteristic of the Grade 52 type Neodymium material) of 14,800 Gauss.

A typical Neodymium (Grade 52) cylinder magnet 112 that was used in the embodiments 101A-101D has a diameter of 9.5 mm and a length of 25 mm and its surface magnetic flux value will be in a range of 6,250 to 7,150 Gauss, which is diametrically magnetized with its North and South Poles along the length of the cylinder; and its $B_r$ (the internal residual magnetism, characteristic of the Grade 52 type Neodymium material) of 13,200 Gauss.

The Magnetic Field strength along the central axis of the field utilized in the present embodiment 101A-101D can be calculated using known formulas. It is a function of the shape of the magnet and the grade of magnetic material. Other methods include the use of FEA (Finite Element Analysis) software, experimental measurement with a magnetometer, or a combination of both and described mathematically as (9):

$$B_x = \frac{B_r}{2}\left[\frac{r+D}{\sqrt{L^2+(r+D)^2}} - \frac{D}{\sqrt{L^2+D^2}}\right] \quad (9)$$

$B_x$=the magnetic field strength through the coil 104 between the North Pole of the cylinder magnet 112 and the South Pole 811 of the left focus magnet 509-1 on the front side of the frame 106 and between the South Pole of the cylinder magnet 112 and the North Pole 813 of the right focus magnet 509-4 on the back side of the frame 106.

r=radius of the cylinder magnet. (present embodiment 9.5 mm)

D=Distance from the face of the magnet surface; the halfway point between the focus magnet and the cylinder magnet. (present embodiment 5 mm/2)

L=the length of the cylinder magnet. (present embodiment 25 mm)

$B_r$=Residual Induction, also called "Residual Flux Density". The magnetic induction remaining in a saturated magnetic material after the magnetizing field has been removed. This is the point at which the hysteresis loop crosses the B axis at zero magnetizing force, and represents the maximum flux output from the given magnet material. By definition, this point occurs at zero air gap, and therefore cannot be seen in practical use of magnet materials. (for the present embodiment this constant is calculated so that $B_r$ is the sum of the residual flux density of the focus magnet and the cylinder magnet)

Using the parameters described for the present invention's preferred embodiment, the alternating damped sine wave produced will calculate and test to approximately 45 Vac (e.g. with 3500 turns of #40 AWG) with an 'electrical no-load' time duration range of 450 to 500 milliseconds upon swiping the cylinder magnet assembly 102-A with a finger or thumb, thus the preferred embodiment can be utilized as a battery-less and wireless key fob for any useful application. The force of the swipe or flick by a finger or thumb to overcome the force of attraction described above in equations 1, 2, 3, and 4 above is in the range of 0.5 to 1.5 Newtons.

Since this present invention is an AC (alternating current) type of generator, its use as a source of immediate power for electro-mechanical and electronic devices such as a microcontroller type of low RF power ISM Band transmitter module (e.g. Model SAFA9C-XTR by Manufacturer RF Solutions, Ltd, UK) is seen as a battery powered elimination method for sending digitally encoded telegrams to a paired (decoded) ISM Band receiver system. As with all electronic devices classified as microcontroller based, portable type, or remote and mobile systems, their power requirements are DC (direct current) sources. Therefore, the AC power supplied by the present invention can be converted to DC power by rectification and filtering, which changes the overall output parameters in order to supply DC power either by an OEM (Original Equipment Manufacturer) or any licensed manufacturer producing a production system model of the present invention in any possible embodiment.

Figure 9A:
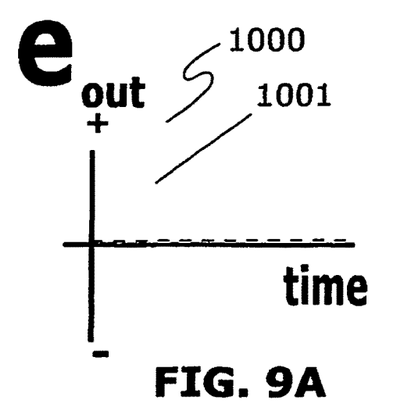
FIG. 9A is a voltage—time plot of cylinder at rest.
Figure 9B:
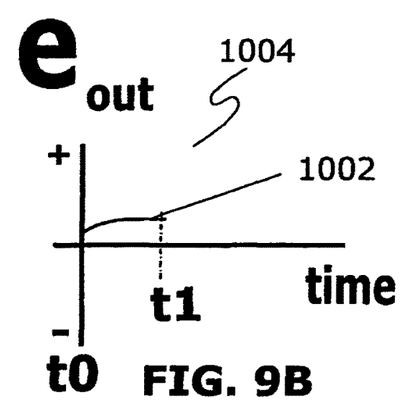
FIG. 9B is a voltage—time plot of cylinder being drawn back.
Figure 9C:
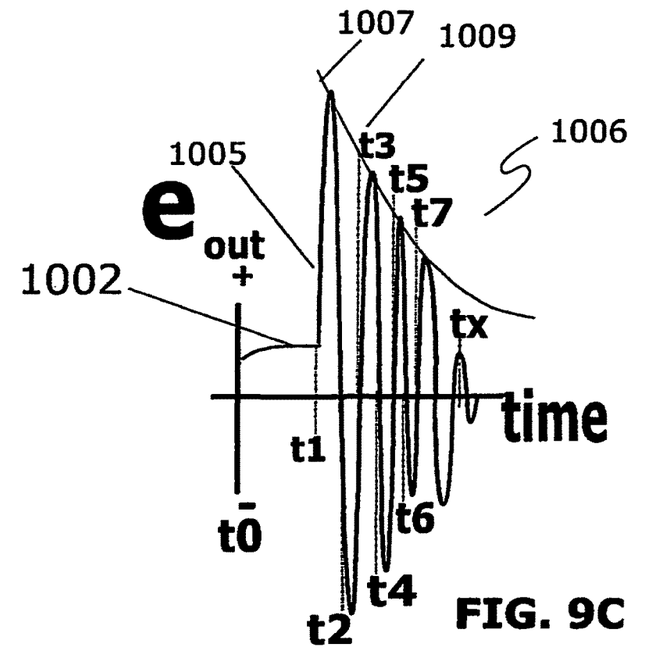
FIG. 9C is a voltage—time plot of cylinder release.

Lenz's Law as described in equation (7) above, the encompassing magnetic field 120 throughout the coil 104 shown in FIG. 8A, FIG. 8B, FIG. 8C at any changing point in time during any movement or no movement (at a quiescent position) of the cylinder magnet assembly 102-A will mathematically influence and determine the instantaneous induced voltage felt at the coil terminals, which is described by Faraday's Law in equation (8) above. Equation (7) mathematically considers the magnetic field intensity encompassing and penetrating the coil winding area and the angle that the magnetic lines of force transverse the coil wire windings. A quiescent state shown in the graph 1001 produces no voltage output from the coil 104 terminals as shown in the waveform graph 1000 FIG. 9A; and as movement initiates, illustrated in the graph 1004 of FIG. 9B at time period from t0 to t1 1002, by the swipe or flick of a finger or thumb, the angular range 817θ and its mirror 819θ, as described in FIG. 8A, FIG. 8B, FIG. 8C and then as the cylinder magnet assembly as shown in FIG. 9C as a graph 1006 is instantly released to oscillate forth and back for several cycles through the coil 104 centre, a damped sinusoidal voltage waveform is produced at the coil 104 terminals as illustrated in FIG. 9C. during the time periods of t1 through tx. These illustrations of FIG. 9A, FIG. 9B, and FIG. 9C represents a clockwise swipe or flick of a finger or thumb, and consequently if the swipe or flick was offered in an anti-clockwise direction the waveforms of FIG. 9B and FIG. 9C would have their phase relationship to a clockwise direction, reversed by 180 degrees. Ergo, the angular displacement over time would result in a changing amount of flux density throughout the coil windings and the resultant field intensity θ, would be mathematically expressed as:

$$\theta = \sum_{N_{long}} \sum_{N_{lat}} \int_{A_{i,j}} \vec{B} A_{i,j} \qquad (10)$$

$\sum_{N_{long}} \sum_{N_{lat}}$ = the double summation of the internal resistance of the rectangular coil 104 in the present embodiment 101.

Where:

$$N_{long} = \frac{2 \times h_{coil}}{d_{wire}\sqrt{\frac{\pi}{k_{Cu}}}}, \qquad (11)$$

$h_{coil}$=the rectangular coil,
$d_{wire}$=wire diameter, π is used since the wire is circular.
$k_{Cu}$=Copper fill factor is the fraction of the core window area that is filled by copper
  Mechanisms that cause $k_{Cu}$ to be less than 1:
  Round wire does not pack perfectly, which reduces $k_{Cu}$ by a factor of 0.7 to 0.55 depending on winding technique
  Insulation reduces $k_{Cu}$ by a factor of 0.95 to 0.65, depending on wire size and type of insulation.

$$N_{lat} = \frac{2 \times [(A_{inner} - A_{outer})/2]}{d_{wire}\sqrt{\frac{\pi}{k_{Cu}}}}$$

$A_{inner}$=the inner area of the rectangular coil 104 in the preferred embodiment 101. This open space area is void of copper wire.
$A_{outer}$=the outer area of the rectangular coil 104 in the preferred embodiment 101. The area filled with copper wire.

For this present invention there are many possible embodiments, for various applications and the generator invention can be scaled for a smaller scaled down embodiment or a larger scaled up embodiment. For this preferred embodiment the intended application is for a battery-less and wireless key fob for use in various remote control applications such as remote gate control, remote car door control, remote engine starting, remote detonation, remote lighting control, remote motor control, remote sea craft applications, and other similar remote applications. With the present invention the preferred embodiment is for a battery-less and wireless key fob and with this in mind there is provision for a micro circuit transmitter printed circuit board module the sits inside a port region 126 and this port region 126 has two slits 130 opposite each other for the passage of wires for an external antenna (not shown) to feed thru from the transmitter circuit module and the coil wires that would attach to power terminals on the transmitter module (not shown) and the coil bobbin 104 has two slits 128 opposite each other to allow the coil end terminals (not shown) to feed thru to the transmitter circuit board (not shown).

As shown in the top perspective view of FIG. 3B of one embodiment 101-A showing a small exit hole 110 in the magnet bed 106 to allow for the passing through of an antenna from a small ISM Band transmitter module (not shown) contained within the frame 106 otherwise unoccupied recesses, or attached thereto, for applications of the present embodiment utilized as a battery-less and wireless electronic digitally encoded key system for remote control of gate systems; and for key locks for cars, apartments, homes, offices, or sea craft applications or any usable application requiring remote control whose vital importance is to have stable non-failure operation, which by the principle of operation of the present invention is established by eliminating a battery for operational electrical power.

These and further modifications and substitutions made by one of ordinary skill in the art are within the scope of the present invention which is not to be limited except by the claims that follow.

What is claimed is:

1. An electrical generator, comprising:
   a coil having plurality of turns of wire wound substantially around an elongated center hole that has a length of elongation measured across the center hole, and an outer winding dimension distal from the center hole, the coil is wound substantially parallel to a coil plane and has an axis of symmetry extending through the center hole along the length of elongation and including the coil axis of symmetry;
   an elongated magnet having a diameter, a magnet length and an axis extending along the magnet length, the magnet length being greater than a diameter of the elongated magnet, the elongated magnet having radially opposing magnetic poles on either side of said axis and each pole extending along the magnet length, wherein the elongated magnet is retained in the elongated center hole and disposed to be rotatable on the elongated magnet axis substantially parallel to the coil axis of symmetry; and
   at least one focus magnet disposed substantially at said outer winding dimension, the at least one focus magnet having opposing magnetic poles aligned perpendicular to the elongated magnet axis and disposed to interact with the radially opposing magnetic poles of the elongated magnet as the elongated magnetic pole is rotated on the elongated magnet axis, wherein
   resultant forces between said magnetic poles and the at least one focus magnet increases a magnet magnetic flux line density in a region of the wire coil, and rotation of the elongated magnet intersecting the coil axis of symmetry induces a flow of current in the wire coil.

2. The electrical generator of claim 1, wherein the elongated magnet axis and the axis of symmetry are offset.

3. The electrical generator of claim 1, comprising a plurality of focus magnets each having a North pole magnetic center and a South pole magnetic center substantially disposed on a focus magnet plane parallel to the coil plane.

4. The electrical generator of claim 3, wherein the focus magnet plane is offset from the coil plane.

5. The electrical generator of claim 3, wherein the North pole magnetic center and the South pole magnetic center define a line offset from the coil axis of symmetry.

6. The electrical generator of claim 1, wherein the focus magnet is loosely retained relative the coil allowing relative motion of the focus magnet in response to changes in elongated magnet magnetic field applied thereto.

7. The electrical generator of claim 6, further comprising a frame including the coil and the elongated magnet therein, and further including the at least one focus magnet contained in a focus magnet recess dimensioned larger than the focus magnet.

8. The electrical generator of claim 7, wherein at least one said focus magnet is loosely retained within the frame providing impact with the frame, and the loosely retained focus magnet and the frame comprise materials sufficiently hard to create an audible sound upon said impact.

9. The electrical generator of claim 1, wherein the elongated magnet comprises a permanent magnet enclosed in a non-magnetic tube.

10. The electrical generator of claim 1, wherein one of the elongated magnet and an elongated non-magnetic tube enclosing the elongated magnet comprises an outer surface disposed to extend beyond said coil.

11. A method of generating electricity, comprising:
    providing a coil having plurality of turns of wire wound substantially around a rectangular center hole having a length of elongation of one dimension of the rectangular center hole, and an outer winding dimension distal from the rectangular center hole and wound substantially parallel to a coil plane and having an axis of symmetry extending through the rectangular center hole along the length of elongation and including the coil axis of symmetry;
    positioning an elongated magnet in the rectangular center hole, the elongated magnet having a length and an axis substantially extending along the length, the elongated magnet further including radially opposing magnetic poles on either side of said axis providing a corresponding elongated magnet magnetic field, wherein each of the opposing magnetic poles extends substantially along the elongated magnet length;
    rotating said elongated magnet on said elongated magnet axis in the rectangular center hole substantially parallel to the coil axis of symmetry at least partially within the rectangular center hole, and
    deflecting the elongated magnet magnetic field proximal the coil with at least one focus magnet disposed substantially at the outer winding dimension of said coil.

12. The method of claim 11, further comprising:
    aligning opposing magnet poles of the at least one focus magnet poles perpendicular to the elongated magnet axis.

13. The method of claim 11, further including inducing motion in at least one said focus magnet in response to the rotating of the elongated magnet.

* * * * *